March 24, 1959
A. A. REID
2,879,125
HEADING RECORDER
Filed Dec. 2, 1954
3 Sheets-Sheet 1
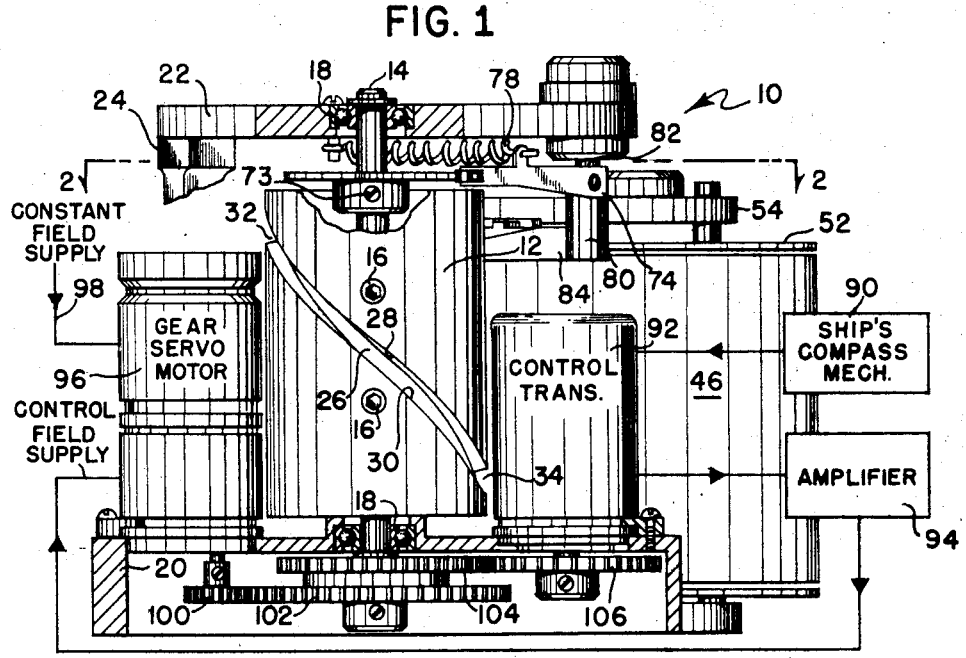
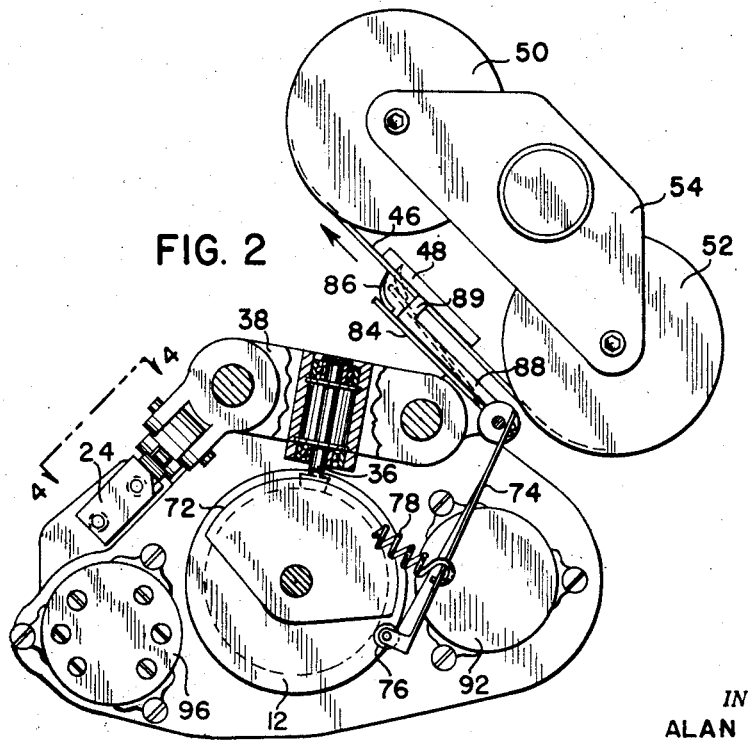
INVENTOR.
ALAN A. REID
BY
Stuart R. Peterson
ATTORNEY

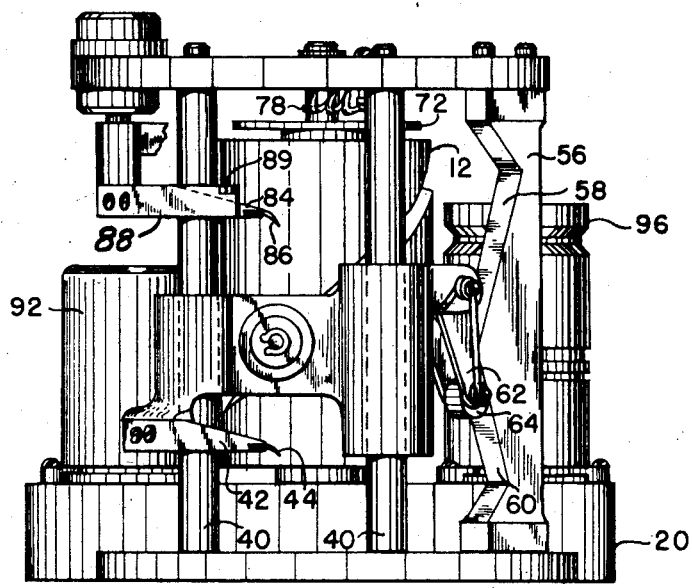
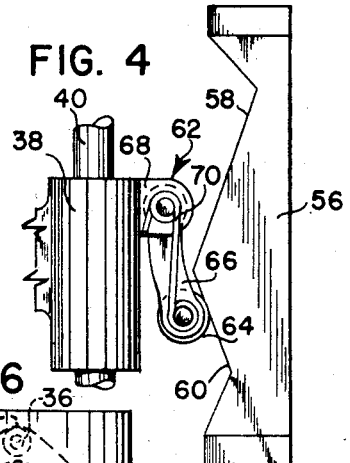
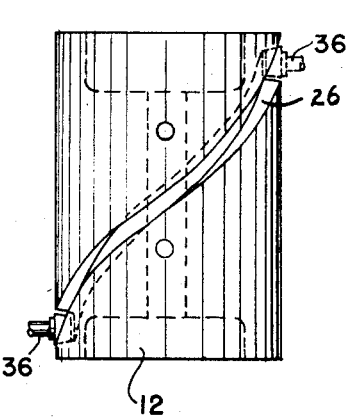
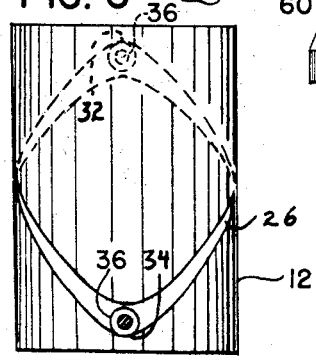

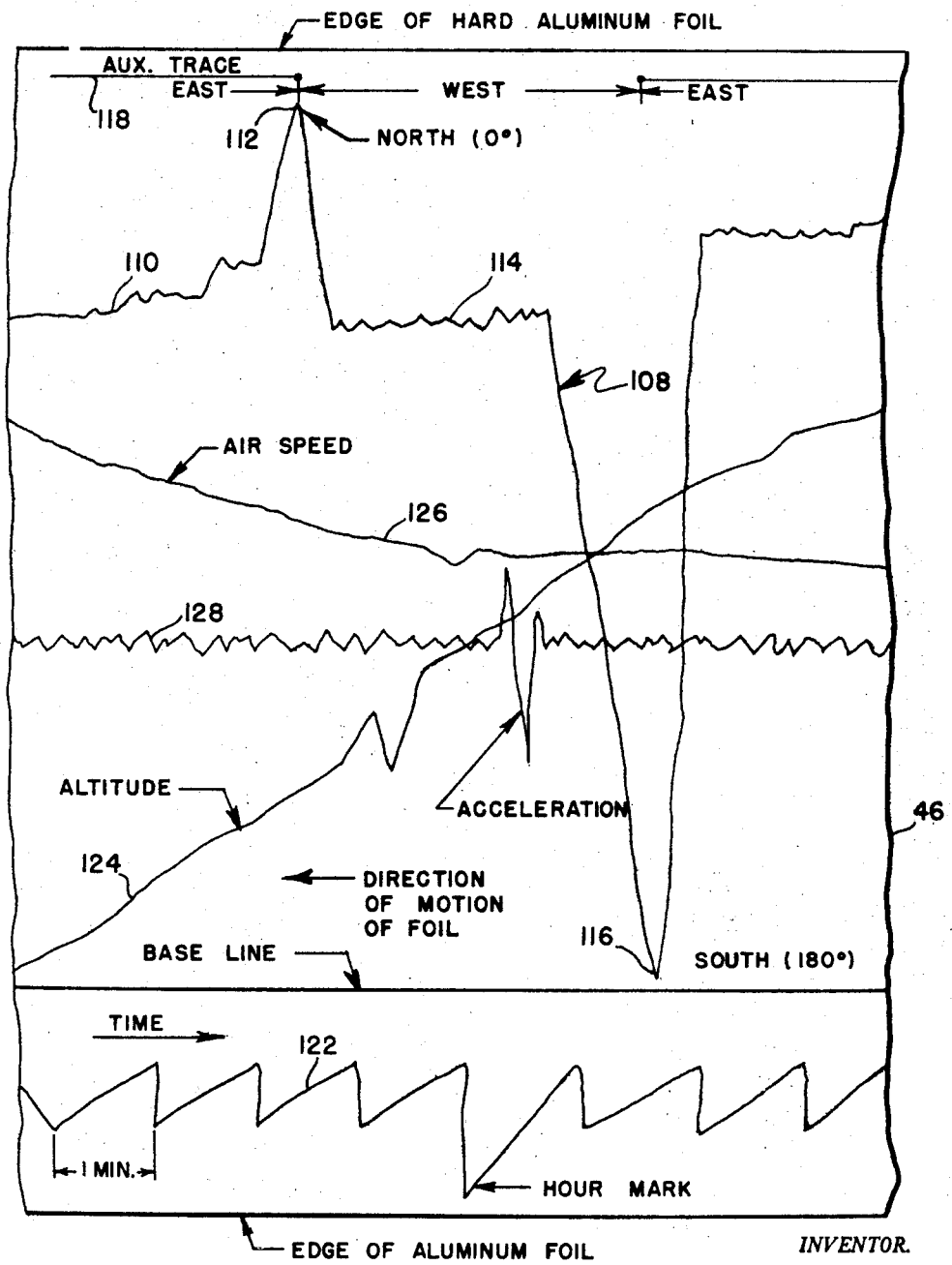

United States Patent Office 2,879,125
Patented Mar. 24, 1959

2,879,125

HEADING RECORDER

Alan A. Reid, Minneapolis, Minn., assignor to General Mills, Inc., a corporation of Delaware Application December 2, 1954, Serial No. 472,561

12 Claims. (Cl. 346—8)

This invention relates in general to recording instruments and pertains more particularly to a heading or course recorder that will find especial utility in preserving aircraft flight information of this character.

In operating modern aircraft, various flight data are desired in order to ascertain the degree of maintenance inspection required and to indicate the cause of aircraft crashes and certain operational failures. Such data includes the proper recording of air speed, altitude, acceleration, compass heading and time. However, the instant invention is concerned only with improved apparatus for accurately recording compass heading or direction. It may, of course, be incorporated with or integrated with apparatus for recording such other flight data that may be desired.

Accordingly, one important object of the invention is to record accurately the heading or course of a craft equipped with a compass system.

In order to carry out the foregoing object, it is an aim of the invention to make a trace on a recording medium that is truly linear in nature, provision being made for a sharp and precise reversal of stylus travel at each end of its rectilinear or reciprocal path.

More specifically, it is within the contemplation of the invention to employ a barrel or cylindrical cam provided with a continuous semihelical groove into which extends a cam follower. By driving the cam in accordance with the various directions taken by the craft, a sliding block or carriage actuated by the cam follower and on which the recording stylus is mounted is caused to traverse a reciprocal path, travel in one direction representing 0–180°, say between north and south toward the east, and travel in the opposite direction indicating movement from 180°–360°, or between north and south toward the west. In order to obviate non-linearity or inaccuracies at the 0° (360°) and 180° points, it is within the purview of the present invention to bias the cam follower in such a manner that it will bear on the outside of the cam groove at the V-shaped bottom and top portions thereof where the carriage reversals are inaugurated, additional cam means being employed to shift the bias at a locus intermediate these extreme groove portions. Stated somewhat differently, the cam follower is compelled to ride against the lower side of the cam groove when it is at the bottom of its travel and against the top side when at the top of its travel.

To enable accurate reading of the main trace representing the course or heading of the craft, it is necessary to provide an auxiliary trace which reliably indicates the general east or west direction the craft is traveling in at a given moment. Since at times the craft will be veering only slightly to either side of a true northerly or southerly direction, it will be apparent that a sharp start and cutoff of this auxiliary trace is much to be desired. With this desideratum in mind another object of the invention is to effect such sharpness in an exceedingly simple and reliable fashion so that it can be accurately ascertained at all times whether the main stylus is registering an east or west course. To this end the auxiliary stylus, actuated by what may be termed an east-west cam, has its spring preloaded against a rigid stop arm so that just the proper amount of contact pressure is exerted by the auxiliary stylus upon the recording medium, preferably aluminum foil.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings,

Figure 1 is a front elevational view of the heading recorder;

Fig. 2 is a top view taken in the direction of line 2—2 of Fig. 1;

Fig. 3 is a rear elevational view with the foil roll assembly removed in order to show parts that would otherwise be concealed;

Fig. 4 is a detail segmental view taken in the direction of line 4—4 of Fig. 2;

Fig. 5 is an elevational view of the barrel cam when viewed from one direction;

Fig. 6 is a view similar to Fig. 5 but showing the cam when viewed from a position at right angles to that of Fig. 5; and Fig. 7 is a section of foil illustrating typical traces that might be employed to indicate various operational information during the flight of an aircraft.

Referring now in detail to the drawings, the reference numeral 10 designates the heading recorder in its entirety and the recorder comprises a barrel cam 12 secured to a shaft 14 by means of a pair of set screws 16. The barrel cam is journaled for rotation about a vertical axis by reason of a pair of ball bearing assemblies 18, one of which is mounted in a base plate 20 and the other of which is disposed in a top or crown plate 22. The two plates 20 and 22 are retained in a spaced relationship with each other by virtue of a plurality of vertical studs 24.

The barrel cam 12 is provided with a groove 26 having upper and lower sides 28 and 30. From Fig. 6 it will be noted that the groove reverses itself at 32 to form what may be termed an inverted V-shaped portion and similarly reverses itself at 34 to form a lower upright V-shaped portion. Stated somewhat differently, the groove 26 constitutes two semihelical portions which extend circumferentially, and axially along the cylindrical cam surface joining together at the apices 32 and 34.

Extending into the groove 26 is a cam follower 36 having a tapered roller thereon which is complemental with the diverging sides 28 and 30. The cam follower 36 is mounted on a carriage or sliding block 38 constrained for vertical rectilinear or reciprocal movement by reason of a pair of upstanding guide rods 40. Also mounted on the carriage 38 is a leaf spring or resilient arm 42 supporting a stylus 44 at its distal or free end. The stylus 44 is spatially arranged so that it engages a recording foil 46 which is preferably of relatively hard aluminum. From Fig. 2 it may be observed that the foil is moved past an anvil plate 48 by means of a take-up spool 50, the foil being payed off from a storage spool 52. Both of these spools 50 and 52 are journaled for rotation within a frame assembly designated generally by the numeral 54. Consequently it will be appreciated that the stylus 44 bears with sufficient pressure against the foil so that a trace or indentation is made which is of such character as to be preserved for later study.

For reasons to be progressively clarified the heading recorder 10 also comprises a vertically disposed cam plate 56 anchored at each end to the lower and upper plates 20 and 22, the cam plate having inclined edges 58 and 60. As best seen in Fig. 5, the upper inclined edge 58 is at a slightly greater angle with respect to the vertical than is the lower edge 60. The purpose underlying this relative angularity is to compensate for the weight of the carriage or sliding block 38. However, as indicated, the function of the cam plate 56 will be explained more fully hereinafter.

A cam follower 62 is associated with the cam plate 56 and comprises a roller 64 which rides over the edges or surfaces 58 and 60, the roller being carried at one end of an arm 66 pivotally connected to a lug 68 which is integral with the carriage or sliding block 38. A spring 70 serves the office of constantly urging or biasing the roller 64 into contact with the edges 58 and 60.

The reason for utilizing the cam plate 56 is so that the cam follower 36 will be urged against the upper side 28 of the groove 26 when in the proximity of the upper V-shaped portion 32 whereas this follower will be urged in an opposite direction, that is against the lower side 30 of the groove when adjacent the V-shaped portion 34. By so doing, a truly linear trace will be produced without objectional disturbance that would otherwise occur in the regions where the V-shaped portions 32 and 34 are located.

Perhaps this desideratum may be better understood by now referring to Figs. 5 and 6. In these two figures it will be noted that the cam follower 36 has progressed from an intermediate locus down to the apex of the V-shaped portion 34. Since there must of necessity be some clearance between the roller constituting the cam follower 36 and the upper and lower sides 28 and 30 of the cam groove 26, it can well be appreciated that when in the vicinity of the V-shaped portion 34, the follower should bear against the lower side 30 of the cam groove. On the other hand, when the follower has reached the upper V-shaped portion 32 the clearance which appears at the top of the follower when at the bottom of its path now should be at the bottom of the follower. In other words, the follower should be consistently urged in an outward direction so that there will be no loss of follower movement when the follower is at either of these locations. To make certain that it is appreciated that only one follower is utilized, the second appearance, that is the upper appearance in Figs. 5 and 6 of the follower, has been shown in phantom outline.

The action of the arm 66, owing to the presence of the spring 70 and the inclusion of the edges 58 and 60, is instrumental in producing a downward bias of the carriage 38 when the roller is in contact with the edge 60. By the same token, when the roller 64 is in contact with the inclined edge 58, the bias against the carriage 38 is upward. This of course accounts for the cam follower 36 bearing against either the upper or lower side of the groove 26 as above outlined.

The heading recorder 10 further includes an auxiliary cam 72 which is best viewed in Fig. 2. This auxiliary cam 72 is secured directly to the shaft 14 by a set screw 73. In this way the auxiliary cam is rotated in unison with the barrel cam 12. However, the auxiliary cam is contoured so that it has an effective camming surface over 180° of its periphery and an ineffective surface over the remaining half. The reason for this configuration is that this auxiliary cam 72 is employed to show in which 180° of operation the main stylus 44 is operating. For example, if the recorder 10 is installed on some form of aircraft, if the aircraft is heading toward the east then it is necessary in reading the recorded medium later on to know that the main stylus was recording a generally easterly direction at that time whereas if the plane is heading west, then knowledge of this general direction is desired. Stated somewhat differently, one portion of the cam 72 is instrumental in indicating a zone or region extending from zero degrees to 180° whereas another portion is responsible for indicating 180° to 360° (0°).

The foregoing action is realized by the use of a follower arm 74 equipped with a roller 76 that is disposed so as to engage the peripheral edge of the auxiliary or east-west cam when the larger radii surface has rotated into alignment with this roller. To assure firm contact with the cam 72 a coil spring 78 is attached at one end to the follower arm 74 and is fixedly anchored at its opposite end.

Associated with the follower arm 74 is a rotatable sleeve or hub 80 circumscribing a downwardly depending shaft 82 supported from the underside of the top or crown plate 22. This sleeve 80 carries a leaf spring or resilient arm 84 which has secured to its free end an auxiliary stylus 86. The leaf spring 84 is preloaded so that it has pressural engagement with a rigid arm 88 integral with the sleeve 80. As shown, the arm 88 is L-shaped when viewed from above and has its short leg 89 pressing against an extending portion of the anvil 48 when the stylus 86 is in contact with the foil 46. In other words, that portion of the arm 88 constituting the leg 89 is disposed at an elevation slightly above the upper edge of the foil 46 so that there will be no interference from the foil. By preloading the leaf spring 84 against the rigid arm 88, whenever the follower arm 74 is actuated by the auxiliary cam 72, the proper amount of contact pressure is brought to bear against the aluminum foil 46 so that a sharper make and cut-off is effected with the auxiliary stylus 86. This is exceedingly desirable inasmuch as the purpose of the auxiliary stylus is to indicate in what direction, that is east or west, the craft is progressing. To illustrate the way that the spring 84 is preloaded or prestressed, the free position of this spring has been indicated in phantom outline in Fig. 2. In other words, if the rigid arm 88 were dispensed with and the foil 46 removed together with the anvil 48, the stylus and leaf spring would assume the dotted position shown (displacement of course exaggerated in the drawing).

Up to this point, nothing has been said about the mechanism which rotates the shaft 14 in correspondence with the direction that the aircraft is taking. While various well-known modifications of apparatus may be employed in obtaining a preferred correspondence between the shaft 14, and hence the barrel cam 12, with the ship's compass, nonetheless one system will be referred to in rather general terms. Referring to Fig. 1, it will be seen that the ship's compass mechanism has been designated by the numeral 90 appearing in block form. The synchro which is included in the ship's compass mechanism 90 is instrumental in controlling another synchro constituting a control transformer labelled 92. The control transformer 92 puts out an error signal which is fed to an amplifier 94 and the amplifier output is in turn fed to a control field forming a part of a gear servo-motor 96. Also, in order to secure proper rotation of the armature of the gear servo-motor there is utilized a constant field supply which has been indicated by the numeral 98. Since this synchro system, as already indicated, is of a standard type, no need is felt to exist for referring to specific frequencies and voltages that might prove practical.

Associated with the gear servo-motor 96 and the shaft 14 is a gear assembly comprising a pinion 100 driven by the gear servo-motor, the pinion meshing with a reducing gear 102. In this way, the reducing gear which is secured to the lower end of the shaft 14 rotates the shaft and consequently the barrel cam 12 at a preferred speed reduction. Also affixed to the shaft 14 is a take-off gear 104 which meshes with a null positioning gear 106 forming a part of the control transformer 92. In this manner the control transformer is constantly returned toward a null position so that further error signals may be constantly transmitted to the gear servo motor 96 via the amplifier 94.

While the foregoing explanation is thought to be adequate for a full understanding of the invention, nonetheless it is believed that a typical record might prove of value. Focussing attention now on Fig. 7, a section of the foil 46 is depicted and it will be seen that a heading trace, denoted generally by the reference numeral 108, has been made by the main stylus 44. For the purpose of illustration, the trace 108 has been made rather tortuous and may be divided up into several meaningful sections. In this connection it may be seen that the section 110 is indicative of substantially a northeasterly direction or at a 45° angle measured clockwise with the zero position. At 112 the aircraft has reached a true northerly or zero degree position in making a turn from the east to the west. By the time the section 114 is formed, then the aircraft is proceeding in a northwesterly direction. Continuing, the numeral 116 is representative of a true southerly direction or a direction at 180°. From this typical recorded trace 108, it will be seen that the points 112 and 116 are spaced 180° with respect to each other for if 112 is considered a north or zero point, then traversal of the main stylus from near the top edge of the foil section 46 to near the bottom edge, as indicated by the point 116, means that the plane has taken an about-face between these points. Obviously, if the aircraft is coursing in a northerly direction and veers intermittently to either an easterly or westerly direction from this true north position, the true linearity of the trace 108 becomes even more important. Also, the trace made by the auxiliary stylus 86, which has been given the numeral 118, is important because whenever the course is in an east or west direction a sharp cut-off is desirable to show that a change has been made from east to west or vice versa even though of very slight magnitude. Since a lack of trace indicates a westerly direction, the gap between the two trace sections 118 has been given the reference numeral 120.

Since the foil 46 will normally record various operational data, it might be well to add to the foil the traces which form no part of the instant invention but nonetheless play an important role in the over-all picture. Therefore a time trace 122 has been shown adjacent the bottom border of the foil 46 in Fig. 7 and it may be stated that each of the small saw-tooth notches is representative of a lapse of one minute whereas the larger notch is indicative of an hour's time. Another trace 124 may represent altitude, another trace 126, airspeed, and still another trace 128, vertical acceleration. As stated earlier, the foil section 46 depicted in Fig. 7 is intended to be a typical one and it might be pointed out in passing that the styli forming the traces 108, 122, 124, 126 and 128 are displaced with respect to each other so that there will be no interference between their respective movements. This last condition is to be taken into account in analyzing the various recorded curves.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A heading recorder comprising a rotatable cylindrical member having continuous track means thereon extending circumferentially and axially toward the ends thereof, means for rotating said cylindrical member in accordance with directional changes of an object, a stylus, means for moving said stylus including a track follower, and means urging said track follower against one side of the track means to eliminate any clearance between said follower and track means at said one side when traversing one portion of said track nearer one end of said member and against the other side of the track to eliminate any clearance between said follower and track means at said other side when traversing a different track portion nearer the other end of said member.

2. A heading recorder comprising a rototable cylindrical member having continuous track means thereon extending circumferentially and axially toward the ends thereof, means for rotating said cylindrical member in accordance with directional changes of an object, a stylus, a carriage mounted for reciprocal movement with respect to said cylindrical member for moving said stylus, track following means for actuating said carriage through its reciprocal path, and means urging said track following means against one side of the track means to eliminate any clearance between said follower and track means at said one side when traversing one portion of said track nearer one end of said member and against the other side of the track means to eliminate any clearance between said follower and track means at said other side when traversing a different track portion nearer the other end of said member.

3. A heading recorder comprising a barrel cam having a continuous groove extending circumferentially and axially toward the ends thereof, means for rotating said cam in accordance with directional changes of an object, a carriage mounted for reciprocal movement with respect to said cam, a stylus supported on said carriage for marking a recording medium, a cam follower mounted on said carriage engageable with either side of said groove to actuate said carriage, and means urging said follower against one side of the groove to eliminate any clearance between said follower and groove at said one side when the follower is traversing one portion of the groove nearer one end of the cam and against the other side of the groove to eliminate any clearance between said follower and groove at said other side when traversing a different groove portion nearer the other end of the cam.

4. A heading recorder comprising a barrel cam having a continuous groove extending circumferentially and axially toward the ends thereof, means for rotating said cam in accordance with directional changes of an object, a stylus, means for moving said stylus including a follower guided by said groove, and means urging said follower against one side of the groove to eliminate any clearance between said follower and groove at said one side when traversing that portion of the groove nearest one end of the cam and against the other side of the groove to eliminate any clearance between said follower and groove at said other side when traversing the portion of the groove nearest the opposite end of said cam.

5. A heading recorder comprising a barrel cam means having a continuous groove extending circumferentially and axially toward the ends thereof forming the bottom and top of rise portions, means for rotating said cam means in accordance with directional changes of an object, a carriage mounted for reciprocal movement with respect to said cam, a stylus supported on said carriage for marking a recording medium, a cam follower mounted on said carriage engageable with either side of said groove to actuate said carriage, and further cam means urging said follower against one side of the groove to eliminate any clearance between said follower and groove at said one side when the follower is traversing said bottom groove portion, and against the other side of the groove to eliminate any clearance between said follower and groove at said other side when traversing said top portion.

6. A heading recorder comprising a vertical barrel cam having a continuous groove extending circumferentially and axially toward the upper and lower ends thereof, means for rotating said cam in accordance with directional changes of an object, a carriage mounted for axial movement with respect to said cam, a stylus supported on said carriage for marking a recording medium, a cam follower mounted on said carriage engageable with either side of said groove for actuating said carriage from one end to the other of its reciprocal path, a vertical cam plate having a pair of inclined, angled surfaces one of which surfaces faces upwardly and the other of which surfaces faces downwardly, a follower arm pivotally connected to the carriage and biased toward said cam plate, and a follower on said arm engageable with the angled surfaces of said cam plate, whereby said first cam follower is urged against the upper side of the barrel cam groove when in the uppermost region of said groove and against the lower side of the groove when in the lowermost region thereof.

7. A heading recorder comprising a barrel cam mounted for rotation about a vertical axis and having a continuous groove extending spirally upwardly from a locus near the bottom of the cam to a locus near the top thereof and then spiralling downwardly to said bottom locus, means for rotating said cam in accordance with directional changes of an object, a carriage, longitudinal guide means mounting said carriage for sliding vertical movement parallel to the axis of said cam, a stylus supported on said carriage for marking a recording medium, a cam follower on said carriage engageable with either the upper or lower side of said groove for moving said carriage over a reciprocal path, a pivotal arm on the carriage, a cam follower on said arm, a vertically disposed cam plate provided with angled upper and lower edges against which said second cam follower rides, spring means urging said arm in a direction to cause pressural contact of said second follower with said angled edges, the upper of said edges sloping upwardly away from the path of said carriage at an angle to raise slightly said carriage and thus cause said first cam follower to bear against the upper side of said cam groove and the lower of said edges sloping downwardly away from the carriage path at an angle to lower slightly said carriage and thus cause said first cam follower to bear against the lower side of said cam groove.

8. A heading recorder in accordance with claim 7 in which said upper cam edge is disposed at a greater angle measured with respect to the vertical than is said lower edge to compensate thereby for the weight of said sliding carriage.

9. A heading recorder comprising a barrel cam having a continuous groove extending circumferentially and axially toward the ends thereof, an auxiliary cam, means for rotating said cams in accordance with directional changes of an object, a first stylus, follower means engageable with either side of said groove to actuate said stylus so as to make a continuous trace on a recording medium, a second stylus, second follower means engageable with said auxiliary cam, resilient means connecting said second follower means with said second stylus, rigid means also movable with said second follower means against which said resilient means is biased, said auxiliary cam being contoured so as to cause said second stylus to produce a trace on said recording medium only during preferred degrees of rotation of said auxiliary cam, and means for urging said first follower means against one side of the groove to eliminate any clearance between said first follower means and the groove at said one side when said first follower means is traversing one portion of the groove nearer one end of the cam and against the other side of the groove to eliminate any clearance between said first follower means and the groove at said other side when traversing a different groove portion nearer the other end of said cam.

10. A heading recorder comprising a barrel cam having a continuous groove extending circumferentially and axially toward the ends thereof, an auxiliary cam, means for rotating said cams in unison in accordance with directional changes of an object, a first stylus, follower means engageable with either side of said groove to actuate said stylus so as to make a continuous trace on a recording medium, a second stylus, second follower means engageable with said auxiliary cam, a resilient arm connected to said second follower means and carrying said second stylus at its free end, a rigid arm also connected with said follower means and movable therewith, said resilient arm being preloaded against said rigid arm and said auxiliary cam being contoured so as to cause said second stylus to produce a trace on said recording medium only during one 180 degrees of rotation of said auxiliary cam with the result that the preloading force is transferred to said second stylus to produce a desired amount of recording pressure, and an additional cam for urging said first follower means against the outer side of said cam groove during degrees of rotation of said auxiliary cam other than when said auxiliary stylus is being changed from a non-recording to recording position and vice versa.

11. A heading recorder comprising a barrel cam mounted for rotation about a vertical axis and having a continuous groove extending spirally upwardly from a locus near the bottom of the cam to a locus near the top thereof and then spiralling downwardly to said bottom locus, an auxiliary cam, means for rotating said cams in unison in accordance with directional changes of an object, a carriage, longitudinal guide means mounting said carriage for sliding vertical movement parallel to the axis of said barrel cam, a stylus supported on said carriage for marking a recording medium, a cam follower carried by said carriage engageable with either the upper or lower side of said groove for moving said carriage over a reciprocal path, a second stylus, a second follower engageable with said auxiliary cam, a resilient arm movable by said second follower and carrying said second stylus at its free end, a rigid arm also movable by said second follower, said resilient arm being preloaded against said rigid arm and said auxiliary cam being contoured so as to cause said second stylus to mark said recording medium only during one 180 degrees of rotation of said auxiliary cam with the result that the preloading force is transferred to said second stylus to produce a desired amount of recording pressure, a pivotal arm on said carriage, a third follower on said pivotal arm, a vertically disposed cam plate provided with angled upper and lower edges against which said third follower rides, spring means urging said arm in a direction to cause pressural contact of said third follower with said angled edges, the upper of said edges sloping upwardly away from the path of said carriage at an angle to raise slightly said carriage and thus cause said first cam follower to bear against the upper side of said cam groove and the lower of said edges sloping downwardly away from the carriage path at an angle to lower slightly said carriage and thus cause said first cam follower to bear against the lower side of said cam groove so that said first follower will always be in engagement with the outermost groove side in the regions where the second stylus is being changed between recording and non-recording positions.

12. A recording mechanism comprising a stylus for making interrupted traces on a recording medium, a cam having high and low portions, a rotatable hub, a follower arm carried by said hub and cooperable with said cam, a rigid arm also on said hub, a leaf spring having one end affixed to said hub and an intermediate portion bearing against said rigid arm and a stylus mounted adjacent the free end of said leaf spring, said leaf spring being biased against said rigid arm with a proper degree of recording force so that when said cam actuates said follower arm in a recording direction said force is transferred from said rigid arm to the recording medium.

(References on following page)

References Cited in the file of this patent

UNITED STATES PATENTS

| | | |
|---|---|---|
| 1,195,665 | Etter | Aug. 22, 1916 |
| 1,676,848 | Au | July 10, 1928 |
| 1,850,978 | Sperry | Mar. 22, 1932 |
| 2,040,501 | Sawford | May 12, 1936 |
| 2,108,037 | Au | Feb. 15, 1938 |
| 2,292,119 | Hackenberg et al. | Aug. 4, 1942 |
| 2,330,082 | Side et al. | Sept. 21, 1943 |
| 2,348,923 | Perricone | May 16, 1944 |